(12) United States Patent
Cailliau et al.

(10) Patent No.: US 10,387,812 B2
(45) Date of Patent: Aug. 20, 2019

(54) MANAGING A TASK

(71) Applicant: DASSAULT SYSTEMES, Velizy Villacoublay (FR)

(72) Inventors: Pierre-Edouard Cailliau, Alligny-Cosne (FR); Vitalii Telerman, Puteaux (FR); Auxkin Ortuzar Del Castillo, Saint-Cloud (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 455 days.

(21) Appl. No.: 14/959,150

(22) Filed: Dec. 4, 2015

(65) Prior Publication Data
US 2016/0180281 A1 Jun. 23, 2016

(30) Foreign Application Priority Data

Dec. 19, 2014 (EP) .................................... 14307113

(51) Int. Cl.
*G06Q 10/06* (2012.01)
(52) U.S. Cl.
CPC ..... *G06Q 10/063118* (2013.01); *G06Q 10/06* (2013.01)
(58) Field of Classification Search
CPC ..................................................... G06Q 10/06
See application file for complete search history.

(56) References Cited

U.S. PATENT DOCUMENTS

| 5,745,110 A * | 4/1998 | Ertemalp | G06F 17/211 345/440 |
| 8,271,614 B2 * | 9/2012 | Barrett | G06F 9/5055 705/7.14 |
| 2005/0160084 A1 * | 7/2005 | Barrett | G06Q 10/06 |
| 2005/0262425 A1 * | 11/2005 | Vignet | G06Q 10/06 715/209 |

(Continued)

FOREIGN PATENT DOCUMENTS

| WO | WO 2006/113717 | 10/2006 |
| WO | WO 2009/044138 | 4/2009 |

OTHER PUBLICATIONS

European Search Report dated Jun. 12, 2015 in European Patent Application No. EP 14 30 7113.

(Continued)

*Primary Examiner* — Kurtis Gills
(74) *Attorney, Agent, or Firm* — Oblon, McClelland, Maier & Neustadt, L.L.P.

(57) ABSTRACT

It is provided a computer-implemented method for managing a task having a start datum and an end datum. The method comprises the step of providing specifications of the task, the specifications including a start range indicative of possible values for the start datum, an end range indicative of possible values for the end datum, and a schedule of the task, the schedule of the task including a scheduled start value for the start datum that belongs to the start range and a scheduled end value for the end datum that belongs to the end range. The method also comprises the step of displaying, (Continued)

on a timeline, bar charts representative of specifications of the task, including at least a bar chart representative of the schedule of the task. Such a method improves the management of a task.

13 Claims, 8 Drawing Sheets

(56) References Cited

U.S. PATENT DOCUMENTS

| | | | |
|---|---|---|---|
| 2006/0044307 A1* | 3/2006 | Song | G06Q 10/06 345/419 |
| 2006/0200372 A1 | 9/2006 | O'cull et al. | |
| 2006/0277487 A1 | 12/2006 | Poulsen et al. | |
| 2009/0199113 A1 | 8/2009 | McWhinnie et al. | |
| 2012/0150576 A1* | 6/2012 | Wagenblatt | G06Q 10/063 705/7.12 |
| 2012/0304187 A1* | 11/2012 | Maresh | G06Q 10/0631 718/103 |
| 2014/0075390 A1* | 3/2014 | Gauthier | G06F 3/048 715/840 |
| 2014/0101666 A1* | 4/2014 | Jackson | G06F 9/5038 718/104 |
| 2015/0046856 A1* | 2/2015 | Rucker | G06F 3/04883 715/765 |
| 2015/0134386 A1* | 5/2015 | Jogalekar | G06Q 10/063118 705/7.13 |
| 2015/0178649 A1* | 6/2015 | Furman | G06Q 10/06312 705/7.22 |

OTHER PUBLICATIONS

James M. Wilson, "Gantt charts: A centenary appreciation". European Journal of Operational Research 149 2003, pp. 430-437.

Jonathan Stillman, et al. "Tachyon: A constraint-based temporal reasoning model and its implementation", SIGART Bulletin, Jul. 1993, vol. 4, #3, 4 pages.

V.V. Telerman, "Constraint Propagation in Subdefinite Models", Institute of Cybernetics Estonian Academy of Science, Technical Report CS, 57/93, NATO Advanced Study Institute, Constraint Programming, 1993, 8 pages.

Rina Dechter, et al., "Temporal Constraint Networks", Artificial Intelligence 49 1991, pp. 61-95.

Léon Planken, et al., "P$^3$C: A New Algorithm for the Simple Temporal Problem", Proceedings of the Eighteenth International Conferences on Automated Planning and Schedulin, ICAPS, 2008, p. 256-263. AAAI.

* cited by examiner

MANAGING A TASK

CROSS-REFERENCE TO RELATED APPLICATIONS

This application claims priority under 35 U.S.C. § 119 or 365 to European Application No. 14307113.2, filed Dec. 19, 2014. The entire contents of each of the above applications are incorporated herein by reference.

FIELD OF THE INVENTION

The invention notably relates to the field of computer science, and more specifically to a computer-implemented method, a computer program, and a computer system for managing a task.

BACKGROUND

In computer-based techniques involving user-machine interaction, the graphical user interface often plays an important role as regards the efficiency of the technique. Many computer systems in general, and CAD, CAE, CAM and/or PLM systems in particular, provide task management and tools in order to help users perform their work in a more efficient way. Task management is also essential to collaborative work.

Methods for tasks scheduling have been described in the literature and there are many commercial and free schedulers available. These include milestone charts, Gantt charts (described in Wilson, James M. (1 Sep. 2003). *"Gantt charts: A centenary appreciation"*. European Journal of Operational Research 149 (2)), networks, line of balance, and combinations thereof. All have advantages and disadvantages depending on the type of project activity involved. Networking is often preferred for large, one-of-a-kind type projects, but it is not suited to repetitive manufacturing processes. Rather, line of balance or manufacturing flow schedules would be more appropriate. The simplicity and ease of use of milestone and Gantt charts makes them appealing to many managers, but these techniques do not easily accommodate the complexities associated with interdependencies among tasks. All these techniques differ by the nature of considered data, how such data are shown to users, and how the user can interact with the system. Data can be specified by exact values or by approximately known values. The scheduling techniques can differ also by what tasks data are taken into consideration. Some techniques establish a timetable of start and finish times, or a timetable of start times and of tasks durations.

For example, In the Time-Ex (registered trademark) solver described in Kandrashina E. Yu., Markin V. S., Telerman V. V. *"Subdefinite models in an intelligent time scheduling environment"*, Theory and application of Artificial Intelligence, The II International Conference, Vol. 1, Sozopol, 1989, P. 181-186., tasks are represented by blocks, such as the ones shown in FIG. 1 which represents faithfully a typical screenshot using Time-Ex. Each is appropriately positioned on the time line and stacked vertically. The length of the block corresponds to the maximal possible duration of the event. The left side corresponds to the earliest possible start time, while the right side corresponds to the latest possible finish time. The interval of uncertainty for the start time is represented by a red band in the top left corner. Similarly, a blue band in the bottom right corner indicates the interval of potential finish times. In "Tachyon" (registered trademark), described in Arthur, R., Deitsch, A., and Stillman, J. *"Tachyon: A constraint-based temporal reasoning model and its implementation"*, SIGART Bulletin, July, 1993, Volume 4, #3, tasks (events) are represented as in Time-Ex, as shown on FIG. 2 which represents faithfully a typical screenshot using Tachyon. The only difference is that Tachyon clearly shows tasks durations. Indeed, the length of the two (black) bands across the center of the block shows the minimum and maximum durations for the event. A recent project management tool named LiquidPlanner (registered trademark) from LiquidPlanner Inc. also uses ranges for task's duration estimation, as shown on FIG. 3 which represents faithfully a typical screenshot using LiquidPlanner. Ranged estimates capture the amount of uncertainty associated with each task. If the range is quite large, the amount of uncertainty is high. If the range is small, the task duration is relatively certain. LiquidPlanner sees each range as a bell curve and uses it to calculate an expected completion date (statistics based).

However, within this context, there is still a need for an improved solution to manage a task.

SUMMARY OF THE INVENTION

It is therefore provided a computer-implemented method for managing a task having a start datum and an end datum. The method comprises the step of providing specifications of the task. The specifications include a start range indicative of possible values for the start datum, an end range indicative of possible values for the end datum, and a schedule of the task. The schedule of the task includes a scheduled start value for the start datum that belongs to the start range and a scheduled end value for the end datum that belongs to the end range. The method also comprises the step of displaying, on a timeline, bar charts representative of specifications of the task, including at least a bar chart representative of the schedule of the task.

The method may comprise one or more of the following:
- the task has a duration datum and the specifications further include a duration range indicative of possible values for the duration of the task;
- the displayed bar charts further include a bar chart representative of the minimum of the duration range and displayed contained by the bar chart representative of the schedule of the task, and/or a bar chart representative of the maximum of the duration range and displayed containing the bar chart representative of the schedule of the task;
- the specifications of the task are editable through predetermined rules of user-interaction with the bar charts;
- at least one user-interaction with a respective bar chart includes continuously moving an extremity of the respective bar chart on the timeline, and accordingly editing the specifications of the task represented by the respective bar chart;
- during the move of the extremity of the respective bar chart on the timeline, upon the extremity of the respective bar chart encountering an extremity of another bar chart, the method reflects the move of the extremity of the respective bar chart to the extremity of the other bar chart and accordingly edits the specifications of the task represented by the other bar chart;
- the encountered extremity of the other bar chart has an attribute whose value is indicative of an authorization to move, the reflection of the move to the extremity of the other bar chart being controlled by the value of said attribute;

when the value of the attribute is indicative of freedom to move, the extremity of the other bar chart is moved together with the extremity of the respective bar chart, whereas when the value of the attribute is indicative of interdiction to move, the move of the extremity of the respective bar chart is blocked;

the predetermined rules of user-interaction comprise sliding a bar chart on the timeline, and/or modifying the length of a bar chart;

sliding a bar chart is performed by picking an interior of the bar chart and moving the bar chart, and modifying the length of a bar chart is performed by picking and moving an extremity of the bar chart;

the displayed bar charts further include a bar chart representative of the start range and displayed containing the left extremity of the bar chart representative of the schedule of the task, and/or a bar chart representative of the end range and displayed containing the right extremity of the bar chart representative of the schedule of the task; and/or the task is a manufacturing task, a maintenance task or a mechanical part design task.

It is further provided a computer program comprising instructions for performing the method.

It is further provided a computer readable storage medium having recorded thereon the computer program.

It is further provided a computer system comprising a processor coupled to a memory and a graphical user interface, the memory having recorded thereon the computer program.

It is further provided a task by the method. It is further provided a data file storing the task. It is further provided a data structure storing the task.

It is further provided a method for manufacturing an industrial product. The method for manufacturing the industrial product may optionally comprise the steps of designing a three-dimensional object that represents the industrial product, and then manufacturing the industrial product based on the designed three-dimensional object. The method for manufacturing the industrial product includes the method for managing a task, within the designing or within the manufacturing. For example, the task represents a step of the design or of the later actual manufacturing.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
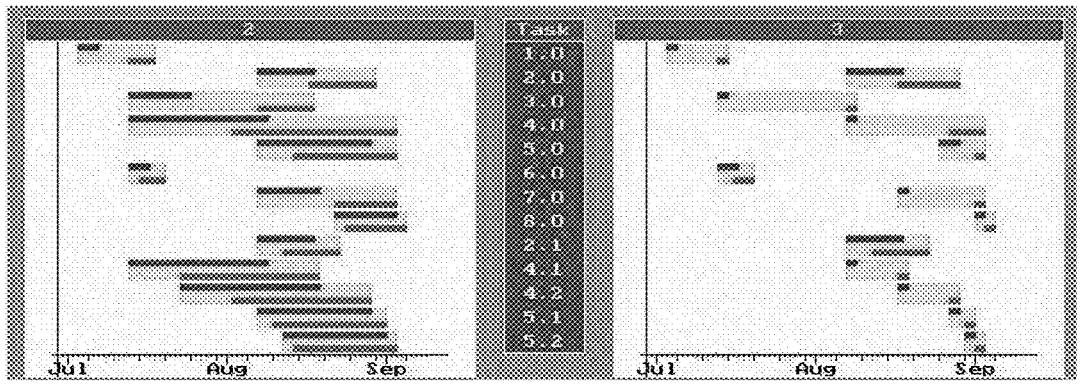
FIGS. 1-3 show screenshots of prior art systems, in color to keep the representation faithful.
Figure 2:
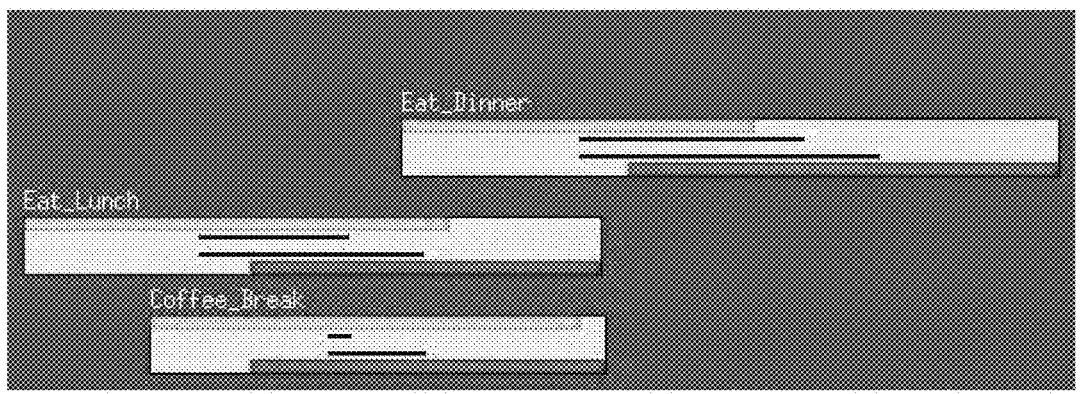
Figure 3:
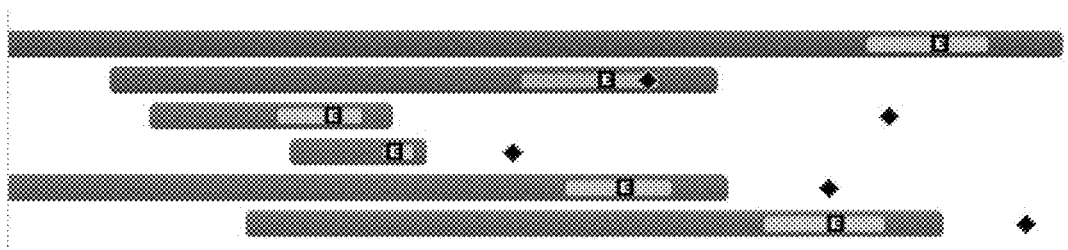
Figure 4:
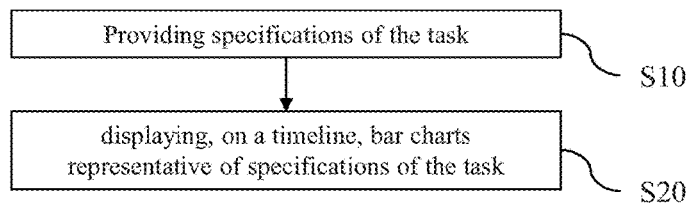
FIG. 4 shows a flowchart of an example of the method.

With reference to the flowchart of FIG. 4, it is proposed a computer-implemented method for managing a task having a start datum and an end datum. The method comprises a step of providing S10 specifications of the task. The specifications include a start range indicative of possible values for the start datum, an end range indicative of possible values for the end datum, and a schedule of the task. The schedule of the task includes a scheduled start value for the start datum that belongs to the start range and a scheduled end value for the end datum that belongs to the end range. The method also comprises a step of displaying S20, on a timeline, bar charts representative of specifications of the task. The displayed bar charts include at least a bar chart representative of the schedule of the task. This method improves task management.

Indeed, because the specifications of the task include not only a schedule of the task, but also a range for the start datum (i.e. the start range) and a range of the end datum (i.e. the end range), the method allows the specification of a flexible task. In effect, the start range and the end range provide a certain level of uncertainty for defining the start value and the end value of the task. Associating the allowed uncertainty directly to the start and the end of the task in the data structure allows an easier apprehension by the user. But because a schedule of the task is also provided, and displayed, the user can apprehend a concrete and precise instance of the task.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined. For example, the providing S10 may be performed via user-interaction, while the displaying S20 may be performed by the computer solely. The editions mentioned later may also be performed via user-interaction.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database, e.g. containing tasks involved in instances of the method. The memory is any hardware adapted for such storage, possibly comprising several physical distinct parts (e.g. one for the program, and possibly one for the database).

Figure 5A:
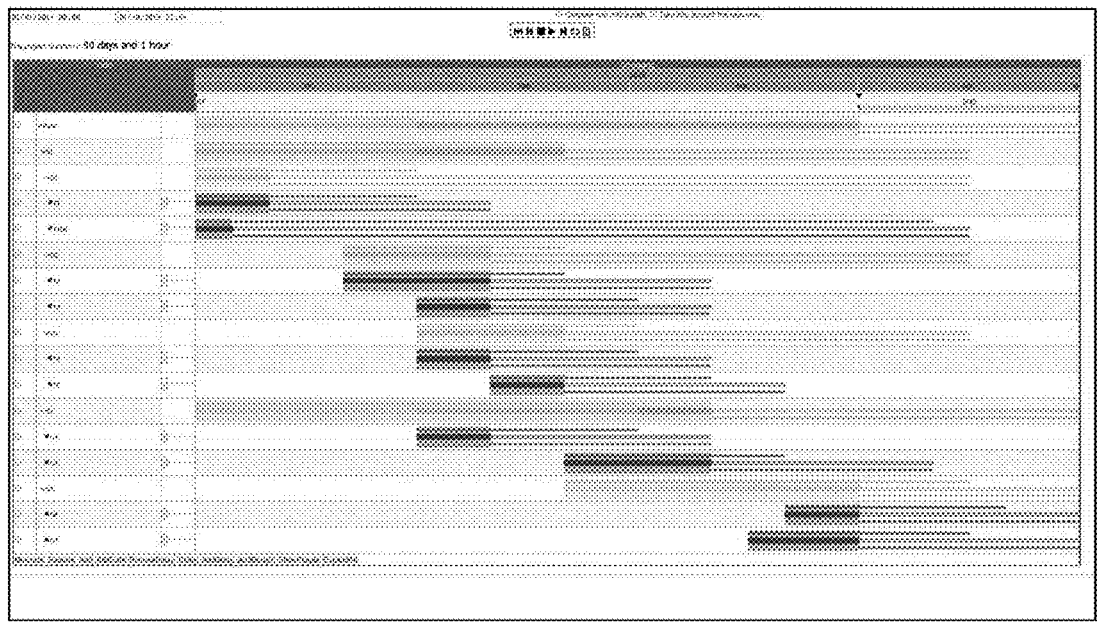
FIGS. 5A-5B show a full screenshot for an example of a GUI of the system.
Figure 5B:
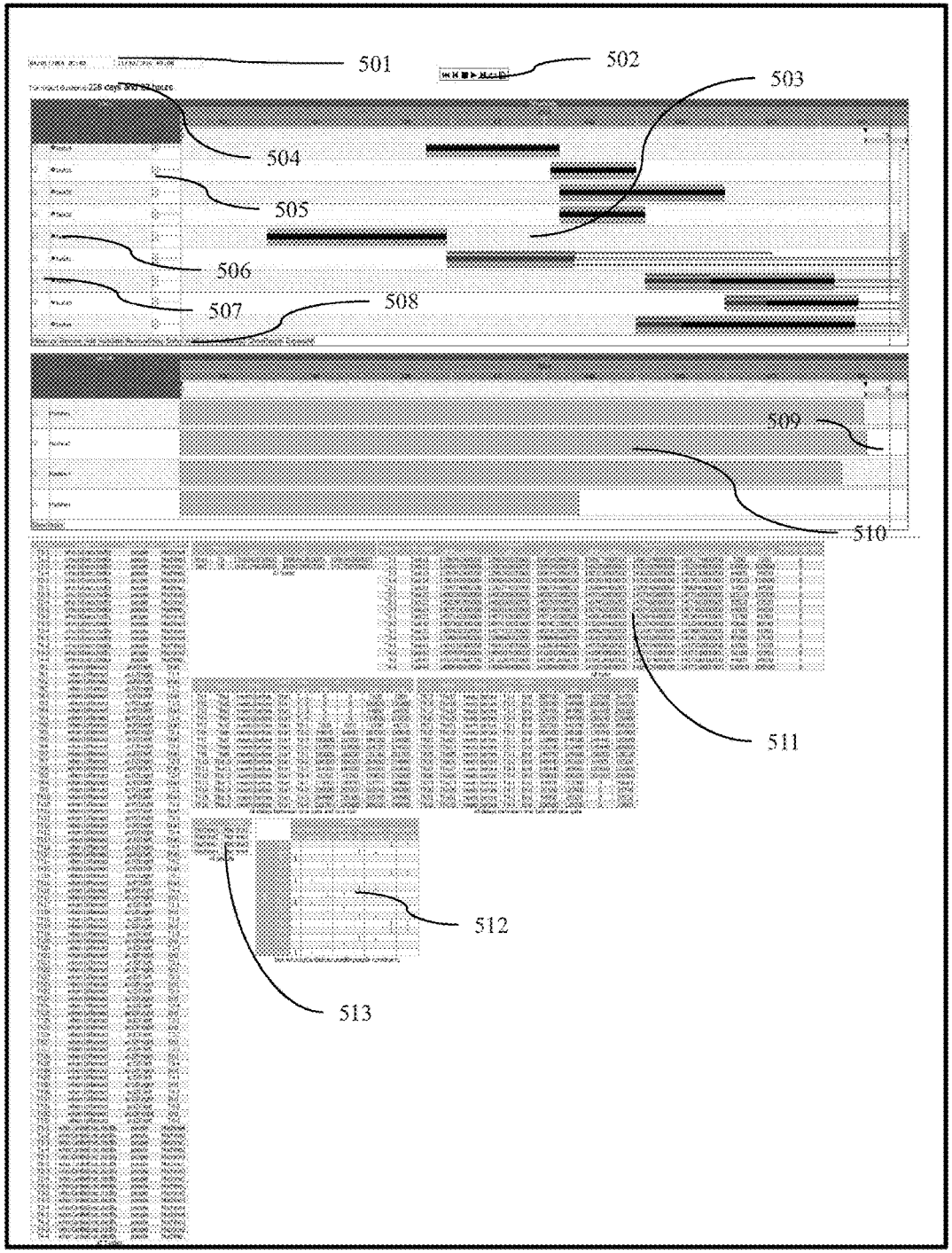

FIGS. 5A and 5B show an example of the GUI of the system, and a screenshot using such a GUI. FIG. 5B is a comprehensive view, with many widgets provided. FIG. 5A is a simplified view.

The GUI may be a typical project management interface, having standard menu bars, as well as bottom and side toolbars 508. Such menu- and toolbars contain a set of user-selectable icons, each icon being associated with one or more operations or functions, as known in the art. Some of these icons are associated with software tools, adapted for editing and/or working on the modeled project displayed in the GUI, the displayed modeled project being for example the result of performing the method. The software tools may be grouped into workbenches. Each workbench comprises a subset of software tools. In particular, one of the workbenches is an edition workbench, suitable for editing temporal features and resources assignment information of the modeled project. In operation, a project-leader may for example pre-select a task of the project and then initiate an operation (e.g. change the dates, progressing rate 505) or edit temporal constraints by selecting an appropriate icon. For example, typical project management operations are the updating of the processing rate or the assignment of some resources to a particular task. The GUI may for example display data related to the displayed project. In the example of FIG. 5B, the data, displayed as a "Gantt diagram" 503, include: a graph of constraints, lists of resources 513, their loads representation 510 pertain to project management, project status and project makespan 504, list of tasks and their hierarchy including root tasks and leaf tasks 506, current date and time position 509, table with all delays information of temporal constraints 511, incidence and allocation matrix between tasks and resources 512. The GUI may further show various types of graphic tools 501 for example for facilitating temporal scope of the project, for triggering a simulation 502 of an operation of an edited project 507, 508 or render various attributes of the displayed task 503. A cursor may be controlled by a haptic device to allow the user to interact with the graphic tools.

Figure 6:
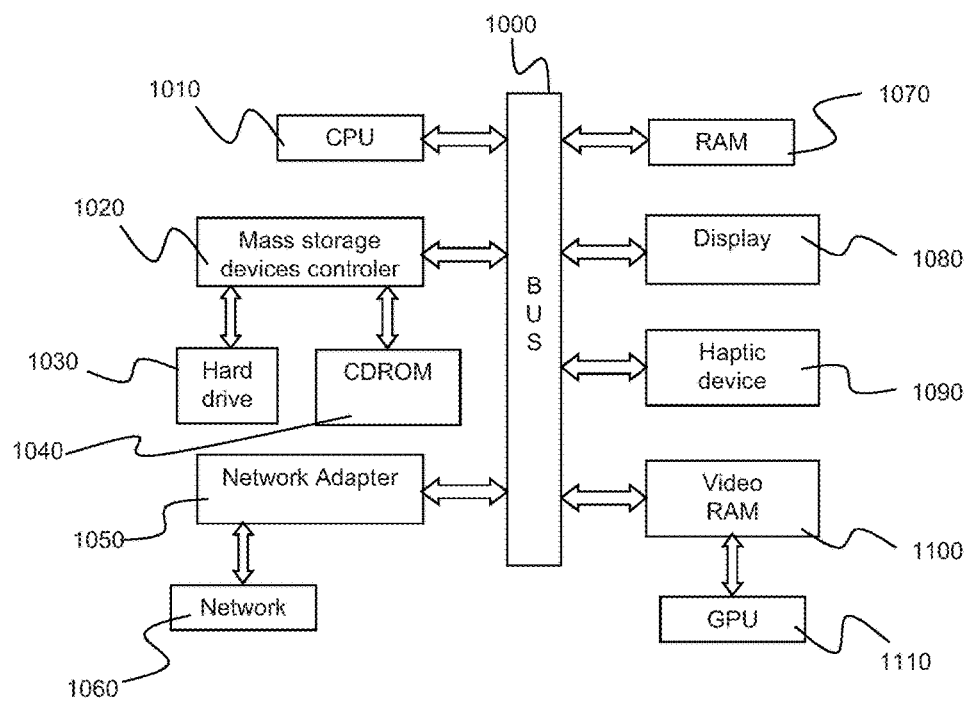
FIG. 6 shows an example of the system.

FIG. 6 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

A task is, in the sense of the invention, information relative to a period of time (the period of time being possibly uncertain) and to a piece of work to be accomplished within said period of time. Therefore, the task has among said information at least a start datum that corresponds to the start of the period of time and an end datum that corresponds to the end of the period of time. The start and/or the end of the period of time may be past or possibly past (relative to the current time, i.e. the time at which the method or a step of the method is being performed), such that the piece of work has already begun (or potentially begun, or supposed to have begun) and/or is already finished (or supposed to be finished). The piece of work may be any piece of work. The task defines the piece of work in any known way, such as—among the computer data forming the task—text (e.g. title and/or more detailed description) and/or graphical representation(s) (e.g. 2D drawing(s)) that describe the piece of work. In an example, the piece of work is a manufacturing/maintenance work or a mechanical part design work. In other words, the task is a manufacturing task or a mechanical part design task. In such a case, the method, system and program for managing a task may be embedded in a CAD system, CAE system, CAM system, and/or PLM system. The piece of work may for example be a step within any industrial process, such as a manufacturing process of an industrial product or a maintenance process on an industrial product.

The industrial product may be one found in various and unlimited industrial fields, including: aerospace, architecture, construction, consumer goods, high-tech devices, industrial equipment, transportation, marine, and/or offshore or transportation. It may be a part of a terrestrial vehicle (including e.g. car and light truck equipment, racing cars, motorcycles, truck and motor equipment, trucks and buses, trains), a part of an air vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

In a more general way, the piece of work may correspond to a step (or work item) in an (industrial, personal or marketing) program or project. These tasks are usually assigned to resources (e.g. staff, machines, vehicles). Some domains where these tasks are common include: Software development, Architecture, Engineering and Construction (AEC), Supply Chain Management, Consumer Goods, Mining, Aerospace, Automotive, Shipbuilding, Retail, Energy. In the healthcare domain, such steps can for instance be related to hospital facilities reservations, or bed planning optimization. The piece of work may also correspond to a step in a timetable (transportation timetable—e.g. train, airplane—, staff/crew scheduling: airlines, railways, mass transit and buses, nurse rostering problem).

The piece of work may also be a step within a design process, for example collaborative design, such as the design of any of the previously mentioned products. The method may thus be related to manufacturing processes, maintenance processes and/or design processes, by being performed prior and/or parallel to any of such processes, and/or such processes may be performed according to decisions made based upon the displaying S20.

Now, because the method is computer-implemented, the task is defined by specific computerized data, namely the "specifications" provided at S10. These specifications include a start range indicative of possible values for the start datum, an end range indicative of possible values for the end datum. The start range and the end range (as all ranges, or "intervals", mentioned in the present application) are merely ranges of contiguous values stored and associated in any known way to the start datum and the end datum. The start range and the end range may be of the same topology, for example both discrete (or continuous), for example with a constant and same step between adjacent values, e.g. the step being a month, a week, a day, an hour, a minute, a second, or any combinations and/or fractions thereof, or alternatively a step variable in any way. A range has a minimum value and maximum value. Therefore, the start range and the end range both have a minimum value and maximum value, also called "start lower bound", "start upper bound", "end lower bound" and "end upper bound" in the following. The start range and the end range allow flexibility to the task. The specifications also include a schedule of the task. The schedule of the task is a certain (meaning "sure/definite", as in "not uncertain") definition of the period of time within which the piece of work must be accomplished. In other words, the schedule of the task corresponds to one possible realization/instance/occurrence of the task (that is with exact values for the period of time, where uncertainty is removed). The schedule of the task thus includes an exact start value and an exact end value, also called respectively "scheduled start value" and "scheduled end value" in the following. The scheduled start (resp. end) value corresponds to the start (resp. end) datum and thus belongs to the start (resp. end) range. The system ensures this belonging in any known way, for example by forbidding values breaking the rule or by outputting an indication, also referred to as "alert" in the following (e.g. audio and/or visual), when the rule is broken, more detailed examples being mentioned later. Thus, the method provides at S10 a certain schedule of the task, but the data defining the task also include ranges that represent uncertainty around the start of the task and the end of the task. This uncertainty data can be used in any way, for example displayed to the user.

The method then displays at S20, on a timeline, bar charts (at least one) that represent specifications of the task, including at least a bar chart representative of the schedule of the task. At this point, the method displays an exact information of the period of time of the task: the schedule. This is done via a bar chart represented on a timeline. The timeline is any graphical representation of a chronology. For example, the timeline includes a scale from a reference starting date until a reference ending date. A current time may also be displayed, for example as a (e.g. vertical) line. The timeline may also include an arrow representative of the direction of time. The timeline may be straight and/or horizontal, e.g. chronological from the left to the right. In any case, the method displays the bar charts on the timeline (thus horizontally if the timeline is horizontal), as known as such from the art. Thus, the bar charts each represent the period of time of the timeline on which they stand. The bar chart representative of the schedule of the task is thus positioned, during the displaying S20, on the timeline between the date (i.e. time) of the timeline corresponding to the scheduled start value and the date (i.e. time) of the timeline corresponding to the scheduled end value.

The method may display other tasks on the same timeline. All the tasks may for example be displayed parallel to each other, e.g. piled up, in any order, possibly user-defined. Bar charts relative to a task may be stacked (e.g. adjacent, superposed and/or overlapping) together, and each stack of bar chart(s) defining a task may be separate from the stack(s) of bar chart(s) defining other task(s), e.g. the stacks being piled up. The current time may also be displayed, e.g. as a vertical line, e.g. cutting all bar chart(s). These features are all well-known from classical task management systems, such as those presented earlier.

The specifications (start/end lower/upper bounds and scheduled start/end values) may be provided at S10 in any way. The specifications may be provided by a user or retrieved from a memory, or received from another user. When the specifications are provided by the user, dialog boxes may be displayed to the user (or opened by the user any time) for the user to input the values, e.g. initially. Alternatively the specifications may be initially provided by interacting with the timeline. Also, default values may be provided when creating a new task. For example, a default bar chart may be instantiated at any time, and then edited. In all cases, the specifications may be edited by the user. Any edits may be performed via dialog boxes or via the user interacting graphically with the displayed bar charts in ways detailed later. The method may thus interlace the providing S10 and the displaying S20 in a continuous iteration, any edition forming a new iteration of the providing S10, and the displaying occurring accordingly and dynamically, in a "what you see is what you get" behavior.

Managing a task covers any action related to a task as defined above. In the case of the method, managing a task includes at least providing specifications of a task (at S10) and then visualizing information about said task (thanks to the displaying S20). As widely know, this allows scheduling, managing, supervising people and/or (e.g. their) tasks. Also, as mentioned earlier, the method may in example include editions of the displayed task(s), which is a form of managing a task.

As mentioned above, a task relates to a period of time for the accomplishment of a piece of work. The period of time relates to the start datum and to the end datum of the task, as it is the period of time defined between said data. This also defines a duration datum. Where the period of time is dated, the duration datum is simply the time difference between the end datum and the start datum and it is thus not dated. In other words, the period of time is a dated instance of the duration datum (i.e. with a clear date for the start datum and/or a clear date for the end datum). Now, because the start datum and the end datum are specified with ranges, not only the period of time is uncertain, but the duration datum may also be uncertain. Indeed, the system may comprise no other constraints than the ranges defined above and hereunder (the constraints being conditions that forbid data values or make an alert, when they are not respected, as mentioned above).

Now, the specifications may nevertheless further include a duration range, which is, in line with the above definitions of ranges, indicative of possible values for the duration of the task. Thus, the uncertainty related to the task is not only conveyed by ranges for the start datum and the end datum, but also by the duration datum. Obviously, as for the start range and the end range, the duration range may be provided at S10 in any way, including by the user, who is therefore offered with yet further flexibility to define the task. The duration range is also a further way to specify a condition imposed on the task.

Now, if range conditions are in algebraic contradictions, this may be handled in any way by the system, for example by forbidding values or by making an alert to the user. Similarly, if the schedule of the task is in contradiction with the duration range (which is possible even in cases where the schedule of the task is in line with the start range and the end range), this can be handled in any way, e.g. by an alert, a forbidding, and/or an automatic correction. All these specifications may be defined at or before S10 in any order.

The user is primarily interest in the instantiated schedule of the task, which is for this reason displayed at S20. But the bar charts displayed at S20 may further include a bar chart representative of the minimum (lower bound) of the duration range, and/or a bar chart representative of the maximum (upper bound) of the duration range. This conveys visual information to the user on the minimum and/or maximum time duration allowed for the task. The user thus sees relevant time information in a bar chart manner, and does not need to perform mental calculus to reach the information. It is noted that the bar charts may be all displayed according to the earlier explanations, notably horizontally, e.g. on a timeline as mentioned earlier, and using the same time scale and/or based on the same reference (e.g. the current time). It is also noted that all bar charts (including those mentioned until now as well as those mentioned later) may be displayed in a distinguishable fashion, bar charts of a category (e.g. bar charts being categorized according to the type of specification/information they represent) being distinguishable from bar charts of other categories. This helps recognition by the user. For example, a same graphical rule may be applied to all bar charts of a category, for said category only, e.g. category-by-category. The graphical rule may typically be a unique color and/or texture and/or form (e.g. rectangle or line, e.g. with a respective width) assigned per category. If the bar charts are however not displayed in a distinguishable fashion, their categories may still be recognized by the user according to their relative positioning, for example as now explained.

The minimum, i.e. lower bound, (resp. the maximum, i.e. upper bound) of the duration range may be specifically displayed contained by (resp. containing) the bar chart representative of the schedule of the task. In the case of bar charts all displayed in a rectilinear direction (e.g. horizontally, the timeline being horizontal), a first bar chart is said to "contain" a second bar chart if the two bar charts have a non-null intersection (i.e. they at least touch each other on the display, because their 2D intersection is a non-null rectangle, or at least a—geometrical—segment of non-null length, i.e. rectangle of null width), if the first bar chart's length is (e.g. strictly) larger than the second bar chart's length, and such that the perpendicular projection of the first bar chart on a line that follows the perpendicular projection (e.g. a horizontal line) contains, in the geometrical meaning, the perpendicular projection of the second bar chart on the same line, as known per se to the skilled person. Examples based on figures illustrate this later. Thus, the user is provided with a visually/geometrically imbricated representation of durations that are timely imbricated, and the user's eye is focused on the same area of the display as all information is concentrated, making the reading of the information easier by the user, as it is based on an appropriate use of the visual cortex.

Similarly, the displayed bar charts may further include a bar chart representative of the start range and displayed containing the left extremity of the bar chart representative of the schedule of the task, and/or a bar chart representative of the end range and displayed containing the right extremity of the bar chart representative of the schedule of the task.

The system may provide a mode selection. The mode selection may allow selecting any of a predetermined (e.g. configured by the user and/or the developer) list of displaying modes, wherein each displaying mode displays a respective combination of different categories of bar charts, possibly with selected graphics (e.g. color and/or texture). The user may thus switch from one mode to another, and notably, e.g. after validation, perform a step of switching from the displaying of the range of the scheduled task only to the displaying of the ranges of the start bound, the end bound and the scheduled task. A selected display mode may apply to all the tasks and bar charts, or alternatively this may hold true by default, with a user then applying a specific mode to individual tasks and/or adding/cancelling display of individual bar charts. This enables adaptation of the representation to the user, who can flexibly control the information he/she is provided with.

The method considers that tasks have a more complex structure than most prior art existing techniques allow to manage and to show. Indeed, almost all prior art existing tools for representing tasks do not handle all the adequate information (concerning tasks) for managing partially defined tasks and scheduling them. They (for instance, Microsoft Project, registered trademark) often ask for exact values when only estimates can be provided. This typically holds true for the start of the task and its duration, or for the start and the end of the task, being noted that only two values theoretically require to be provided, the third one being deducible. These kinds of specifications do not enable to take into account the amount of liberty and uncertainty associated with each task. Indeed, users need tools to help scheduling, not tools constraining them to make choices too early in the process. Existing prior art systems can therefore not display all the interesting information (in particular, the amount of uncertainty of the durations or ranges for the beginning and the ending of the tasks, for example). It is also noted that none of the prior art existing techniques using ranges shows the minimal possible duration and the maximal possible duration. Thus, the duration ranges can be easily specified by the user out of the interval consisting in the minimal possible duration and the maximal possible duration. Such situation can easily arise in the earlier-mentioned prior art Time-Ex solver, for example. One can define in prior art Time-Ex the following input data for the task T: the start range of the task T equals to [0, 5]; the end range of the task T equals to [10, 15]; and the duration interval of the task T equals to [1, 4]. Of course, this specification is inconsistent. The prior art Time-Ex system will detect the contradiction in input data but only after the computation begins. And, the user must find by himself consistent values usually applying a time-consuming trialerror approach via dialog-box inputting. Moreover, even when the tasks durations are shown, their positioning in a timeline is chosen arbitrarily and thus they do not convey enough information. In particular, they do not inform about the possible positions of the scheduled task.

From the point of view adopted by the method, ranges capture better the amount of freedom/uncertainty associated with each task. If the range is quite large, the amount of freedom/uncertainty is high. If the range is small, it means that the user is more constrained or more confident in providing realistic estimates. Moreover, using ranges, the system can in examples estimate closer "best case" (at the earliest), "worst case" (at the latest) or real schedules. When one says that a task will begin between Monday 8:00 and Tuesday 8:00 and take 1-3 (working) days to be completed, the system can point out for instance to the user that, at the best, this task can begin and finish on Monday. But, it can also show the worst case: the task can begin on Tuesday and finish on Thursday night.

The method thus remedies to the deficiencies of the prior art notably by being based, in examples, and as discussed above, on the following task's attributes:
  the range of a start bound (i.e. start datum) defined by a start lower bound and a start upper bound;
  the range of an end bound (i.e. end datum) defined by an end lower bound and an end upper bound;
  the range of a scheduled task defined by a scheduled task start (value) and a scheduled task end (value);
  the range of the duration defined by the lower bound of the duration (minimal duration) and the upper bound of the duration (maximal duration); and, optionally,
  the minimal possible duration restricted by the end upper bound and the start lower bound;
  the maximal possible duration restricted by the end lower bound and the start upper bound.

The method may thus display on a timeline the following task attributes, in the manner described above and illustrated later:
  the ranges of the start bound, the end bound, and the scheduled task;
  the scheduled task start in the range of the start bound or the scheduled task end in the range of the end bound, while optionally ensuring that the scheduled task start complies with the range of the start bound and the scheduled task end complies with the range of the end bound;
  the range of duration and ensures that the duration of the scheduled task complies with the range of the duration;

It is further noted as discussed earlier that the system may further allow the user to switch task views by changing the display from the ranges of the start bound, the end bound, and the scheduled task to the display of the range of the scheduled task only and vice-versa.

In examples, the method offers many advantageous effects. First of all, the three tasks attributes (start, end, and durations) may be consistently managed all together. The system may enable to specify each of these three attributes when the user really wants. It may also enable to show all the information about the task (even any or all of the unspecified data). Secondly, for the start and the end of tasks the system may enable to show ranges, and/or exact values. For task's duration, the definition domain (the minimal possible duration and the maximal possible duration), a range, and/or an exact value may be showed. Thirdly, the system may be able to maintain graphically the correlation between all these three attributes: a) the exact value belongs to the corresponding range; b) the range is inside the corresponding definition domain; c) the three attributes are correlated by three relations applied to ranges and/or to exact values (i.e. end=start+duration; start=end−duration; duration=end−start).

Now, as mentioned earlier, the specifications of the task are (for at least some of them, possibly all of them) editable through predetermined rules (offered by the system) of user-interaction with the bar charts, e.g. performing drag-and-drop like interactions. In other words, the system offers a "what you see is what you get" behavior that conveniently allows the user to modify tasks through direct manipulation of the bar charts, for example via a cursor of a haptic device or via a touch screen or touchpad. This ensures good ergonomics as the user can interact with the data processed by the system (i.e. the specifications of the task) while viewing directly the result of the interaction, the eye of the user being always focused simultaneously on both the interaction area and the modified data.

For the system to be intuitive, at least one of the user-interactions allowed by the system (and possibly all allowed user-interactions) includes, for a respective bar chart, to continuously move an (e.g. at least one, possibly both) extremity of the respective bar chart on the timeline. According to the movement, the method edits the specifications of the task represented by the respective bar chart. In an example, the predetermined rules of user-interaction comprise sliding a bar chart on the timeline, and/or modifying the length of a bar chart. Sliding a bar chart may be performed by picking an interior of the bar chart and moving the bar chart, and/or modifying the length of a bar chart may be performed by picking and moving an extremity of the bar chart. Thanks to such user-interaction, the user may edit a specification of the task by interacting directly with the displayed representation of the specification. This increases the "what you see is what you get" ergonomics.

The movement can correspond to a sliding/displacing of the bar chart, whose length is thus maintained. In that case, both extremities are moved, rigidly one relative to another. This may be done by the user graphically selecting a middle (i.e. interior) area of the bar chart, for example by an interaction with the middle area (such as a click or a finger/touch-pen grab), and then graphically translating the selection (e.g. slide of cursor or finger/touch-pen). Such a movement typically edits both the lower bound and the upper bound of the range represented by the bar chart, but the duration itself is kept constant. Alternatively or additionally, the movement can correspond to a modification of the length (shortening or extension) of the bar chart, e.g. in only one or two direction(s) (e.g. only one extremity being moved in the former case, the other extremity being fixed relative to the timeline). This may be done by the user graphically selecting (e.g. as above) one extremity area(s) of the bar chart and then graphically translating (e.g. as above also) the selection. Such a movement typically edits only one or both of the lower bound and upper bound, with a change of the duration as well. But it is noted that in the case the bar charts all respect the same scale and the same reference in the timeline, the edition of the specifications simply correspond to the graphical position/length of the bar chart resulting from the user edition by graphical interaction with the bar chart. Other graphical interactions accessible to the skilled person may here be performed. Also, as known to the skilled person, the system may provide with interaction with different areas of the bar charts in any known way, e.g. by applying a predetermined computation rule based on length to determine the extremity areas and the middle/ interior area in a direct or indirect way. Also, detection of an area selected by the user may be performed in any classical way.

User-interaction options are now discussed. These options may be turned on/off, together with a mode selection as mentioned above. These options greatly improve the ergonomics of the system. Notably, these options allow the user to perform a continuous and thus unique user-interaction on an area corresponding to a specification he/she is editing, thereby performing and seeing the result simply (to the opposite of systems where many operations need to be done, such as accessing different menus, tabs and/or icons).

In an option, during the above-mentioned move of the extremity of the respective bar chart on the timeline (in some or all the situations presented above), upon the extremity of the respective bar chart encountering an extremity of another bar chart (such encountering being typically detected automatically by the system, e.g. with pixel-intersection detection and/or computations, e.g. when the line perpendicular to one bar chart at said extremity is superposed to the line perpendicular to the other bar chart at said extremity), the method reflects/mirrors/transmits (e.g. automatically, i.e. without any other user-intervention than the one inducing the move) the move of the extremity of the respective bar chart to the extremity of the other bar chart (i.e. the extremity of the bar chart encountered is moved, e.g. according to any of the above-discussed movements for the principal bar chart, i.e. the bar chart under direct manipulation) and accordingly edits the specifications of the task represented by the other bar chart (the bar chart thereby under indirect manipulation thus allowing an indirect edition of the specifications to which it corresponds, e.g. the edition being performed according to the movement as discussed earlier). Such "reflection" of the movement of one bar chart to another bar chart upon extremities thereof encountering (i.e. meeting) each other may be controlled by predetermined rules applied by the system. For example, the reflection may depend on the category of the bar charts (the category of a respective bar chart corresponding, as mentioned earlier, to the type of specifications represented by the respective bar chart). For examples, alternatively, all or not all categories of bar charts may transmit their movement to, alternatively, all or not all categories of bar charts. In another example, the specifications may be hierarchized according to a priority order, and the reflection of the movement of a first bar chart to a second bar chart may be allowed only if the specifications relative to the second bar chart are of lower priority order than those relative to the first bar chart. In yet another example, the reflection is transitive, thus allowing the edition of more than two bar charts (e.g. three or four) via interaction with only one bar chart.

In an option, bar charts may be provided with attributes at one or both of their extremities (this may be done by data association, e.g. via reference pointers and/or database management, as classical in the field of computer science), whose values are fixed (i.e. constant or rigid) according to predetermined rules, or set by the user (possibly after a default value is automatically determined according to a predetermined rule), possibly according to the bar chart type (category of the bar chart). An encountered extremity (as described above) may in particular have an attribute whose value is indicative of an authorization to move (typically, the attribute is binary, with one value (say 1) indicative of freedom to move, and the other value (say 0) indicative of a forbidding of the move). In other words, the system maintains authorizations for bar chart extremities (category-wise, bar-chart wise, and/or extremity-wise) to move or not. The reflection of the move to the extremity of a bar chart may thus be controlled by the value of said attribute. When the value of the attribute is indicative of freedom to move, the extremity of the other bar chart may be moved together with the extremity of the respective bar chart, whereas when the value of the attribute is indicative of interdiction to move, the move of the extremity of the respective bar chart may be blocked (alternatively, e.g. with a pop-up that may be displayed, the system asks the user to confirm the reflection or not). This allows the configuration of the system to make it particularly adapted to any foreseen application. The high ergonomics and freedom offered to the user may notably be managed/controlled according to pre-determined needs.

According to examples discussed above, the user may thus interact with the system to perform any combination of the previous and/or following actions (in any particular order, and with repetitions of the same actions when desired). The user first defines, for a new task, the range of a start bound defined by a start lower bound and a start upper bound, the range of an end bound defined by an end lower bound and an end upper bound, the range of a scheduled task defined by a scheduled task start and a scheduled task end. The system then displays on a timeline as bar charts the ranges of the start bound, the end bound, and the scheduled task. The user may then move/displace/slide the scheduled task start, for example in the range of the start bound or the scheduled task end in the range of the end bound. The system may (substantially) simultaneously ensure that the scheduled task start complies with the range of the start bound, and/or that the scheduled task end complies with the range of the end bound, and then update the scheduled task start and/or the scheduled task end. The user may also provide the range of a duration (of the task) defined by a lower bound of the duration (minimal duration) and an upper bound of the duration (maximal duration). The system may thus display on the timeline the range of duration, and ensure that the duration of the scheduled task always complies with the range of the duration (of the task). The system may, upon edits performed by the user, update the minimal possible duration restricted by the start upper bound and the end lower bound, and/or update the maximal possible duration restricted by the end upper bound and the start lower bound, and/or update the lower bound of the duration, and/or the upper bound of the duration.

Examples of the method and of the displays obtained by the method with an example system are now discussed with reference to FIGS. 7-22.

In line with the above general description, the example system enables to specify the main task features (start date, end date, duration) using intervals (i.e. ranges). This means that users are not forced to provide a "single point" start/end date but they can estimate more roughly a time period (range) when the tasks will be performed. And, unlike other approaches, users can also specify their estimates for the duration the same way as they define the start/end dates. An important option is that the system helps continuously the user during the specification of these values regardless of the order in which the specification is done. This assistance is provided by a particular display of these elements, by specific edition graphical interactions offered to the user and by ensuring that all the stored values are consistent.

Figure 7:
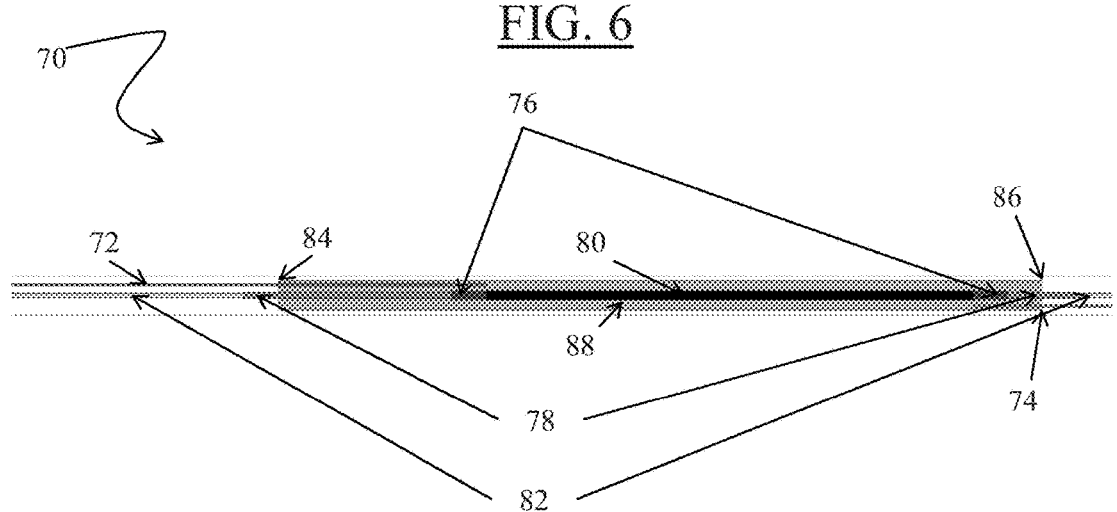
FIGS. 7-23 illustrate the method, by showing parts of real screenshots obtained with an example of the system.

In the example system, with reference to FIG. 7 which shows an example of how a task is displayed by the method at S20, the following data are associated to a task 70 and may be displayed (as on FIG. 7):

the range of a start bound 72;
the range of an end bound 74;
the minimal task duration 76;
the maximal task duration 78;
the minimal possible task duration 80;
the maximal possible task duration 82;
the task start (scheduled) value 84;
the task end (scheduled) value 86;
the task duration (scheduled) value 88.

In line with the earlier explanations, in the example, the range of a start bound is defined by a start lower bound and a start upper bound. Similarly, the range of an end bound is defined by an end lower bound and an end upper bound. The minimal and the maximal task durations define a duration range. The minimal possible and the maximal possible task durations form a duration definition domain. The task start value, end value and duration value define a scheduled task.

Figure 8:
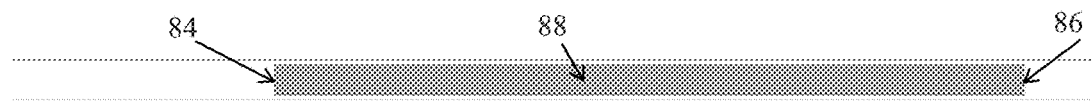

A more standard visualization, shown on FIG. 8, is also be proposed by the example. For the same task, this visualization represents the task's start value 84, end value 86 and duration 88. The user can switch from the standard displaying (FIG. 8) of the scheduled task to the task complex displaying (FIG. 7), containing the ranges of the start bound 72, the end bound 74, all durations (76, 78, 80, 82) superposed with the scheduled task (84, 86, 88), with the particular containing/contained by relationship described earlier. As it is the case in the example of FIG. 7, the scheduled task (84, 86, 88) in the complex view may be represented by the widest rectangle (i.e. largest width).

Figure 9:
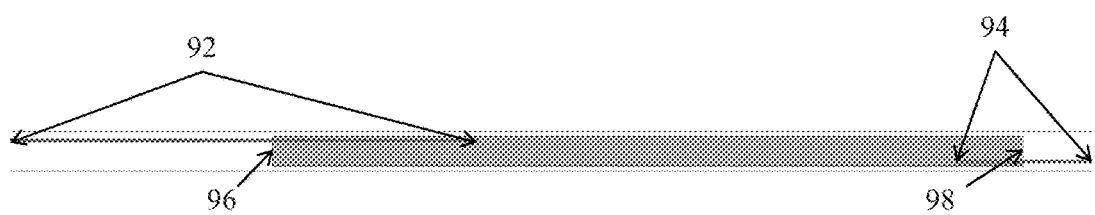

Let us now consider a task 90 that may be displayed as on FIG. 9 using the approach of FIG. 7 and defined, at least, by
the range of a start bound 92;
the range of an end bound 94;
the task start value 96;
the task end value 98.

The range 92 of the start bound consists in two points on the temporal axis: the lower bound ($t_{start}^{low}$) of the range 92 and the upper bound ($t_{start}^{up}$) of the range 92. The range 92 of the start bound defines the time period when the scheduled task can start. Similarly, the range 94 of the end bound consists in two points on the temporal axis: the lower bound ($t_{end}^{low}$) of the range 94 and the upper bound ($t_{end}^{up}$) of the range 94. The range 94 of the end bound defines the time period when the scheduled task can finish.

By definition, we consider that $t_{start}^{low} \le t_{start}^{up}$ and $t_{end}^{low} \le t_{end}^{up}$.

At this stage, the system of the example only ensures at all times that:

$t_{start}^{low} < t_{end}^{low}$ and $t_{start}^{up} < t_{end}^{up}$

The task start value ($t_{start}$) is a point on the temporal axis when the scheduled task should/could really start and the task end value ($t_{end}$) is a point on temporal axis when the scheduled task is supposed to finish.

The user can modify (e.g. by the graphical user-interacting displacement/moving described earlier) the task start value ($t_{start}$) in the range of the start bound to $t_{start}^{new}$ and the scheduled task will remain consistent.

The system may only ensure that:

$$t_{start}^{low} \le t_{start}^{new} \le t_{start}^{up} \tag{1}$$

The user can also modify (e.g. by the graphical user-interacting displacement/moving described earlier) the task end value ($t_{end}$) in the range of the start bound to $t_{end}^{new}$ and the scheduled task will remain consistent.

The system may only ensure that:

$$t_{end}^{low} \le t_{end}^{new} \le t_{end}^{up} \tag{2}$$

The user can also modify (e.g. slide) the task start value ($t_{start}$) and the task end value ($t_{end}$) simultaneously respecting both ranges of the start and end bounds. The new values $t_{start}^{new}$ and $t_{end}^{new}$ are defined as:

$$t_{start}^{new} = t_{start} + \delta \tag{3}$$

$$t_{end}^{new} = t_{end} + \delta \tag{4}$$

where $\delta$ is a positive or negative value.

Here again, the system may only ensure that (1) and (2) are respected.

For a numerical example, let us say that a task must begin between 4 and 10 ($t_{start}^{low}=4$ and $t_{start}^{up}=10$) and finish between 17 and 19 ($t_{end}^{low}=17$ and $t_{end}^{up}=19$). Two consistent values for the scheduled task are, for instance, $t_{start}=7$ and $t_{end}=18$. The user can change the value of $t_{start}$ consistently if $4 \le t_{start}^{new} \le 10$. The user can change the value of $t_{end}$ consistently if $17 \le t_{end}^{new} \le 19$. From a user interaction point of view, there is generally no obligation: users can specify these values in a graphical or textual way. The user can drag the start/end of the task or the task itself, by the graphical user-interacting displacement/moving described earlier. But, he can also set or change the values using a dialog box or a date picker.

Figure 10:
Figure 11:
Figure 12:
Figure 13:
Figure 14:

FIGS. 10-14 show a chronological series of different graphical user-interactions possible with the system, for editing a task displayed according to FIG. 9. FIG. 10 displays the task with its initial specifications. FIG. 11 displays the result of moving the scheduled start value to the right. FIG. 12 displays the result of moving again the scheduled start value to the right. FIG. 13 displays the result of moving the scheduled task (simultaneous start and end) to the right. FIG. 14 shows the result of then moving the scheduled end value to the left.

Figure 15:
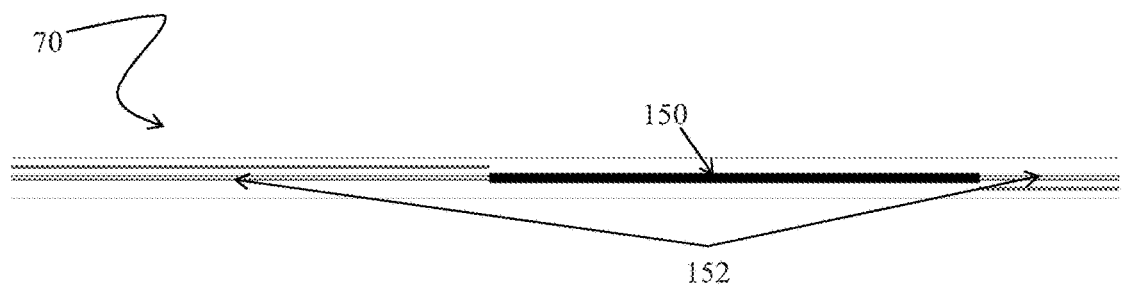

As shown on FIG. 15, which shows a display of task 70 of FIG. 70 but the schedule (80, 82, 84) of the task for clarity, the system of the examples can also handle two other important values:
the minimal possible task duration 150;
the maximal possible task duration 152.

The minimal possible task duration ($D_{min}$) is a lowest bound of the scheduled task duration. On FIG. 15 it is represented by the length of the black bar 150 (whose position may be determined/chosen arbitrarily, for example contained in the schedule of the task). The maximal possible task duration ($D_{max}$) is an uppermost bound of the scheduled task duration. On FIG. 15 it is represented by the length of the lightest blue bar 152 (whose position may be determined/chosen arbitrarily, for example containing the schedule of the task).

The system of the example updates minimal possible task duration and maximal possible task duration according to task start and end ranges in the following way:

$$D_{min} = \max(0, t_{end}^{low} - t_{start}^{up}) \tag{5}$$

$$D_{max} = t_{end}^{up} - t_{start}^{low} \tag{6}$$

The task duration value (d) is obtained as the length of the scheduled task. With a norm, (d) can be computed as:

$$d = t_{end} - t_{start} \tag{7}$$

Figure 16:
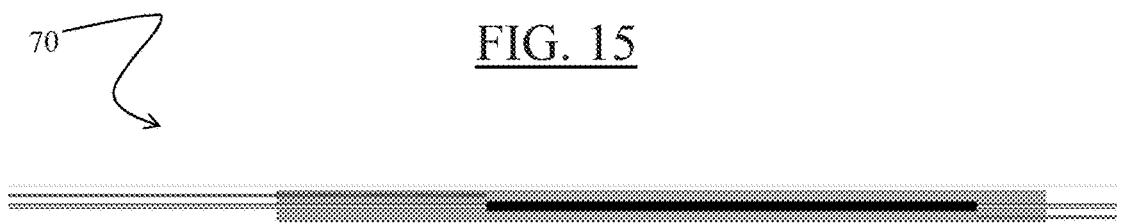

On FIG. 16, it is represented by the length of a widest rectangle going from $t_{start}$ to $t_{end}$.

If we consider the previous numerical example, this means that:

$$D_{min}=7, D_{max}=18 \text{ and } d=11. \tag{8}$$

Figure 17:
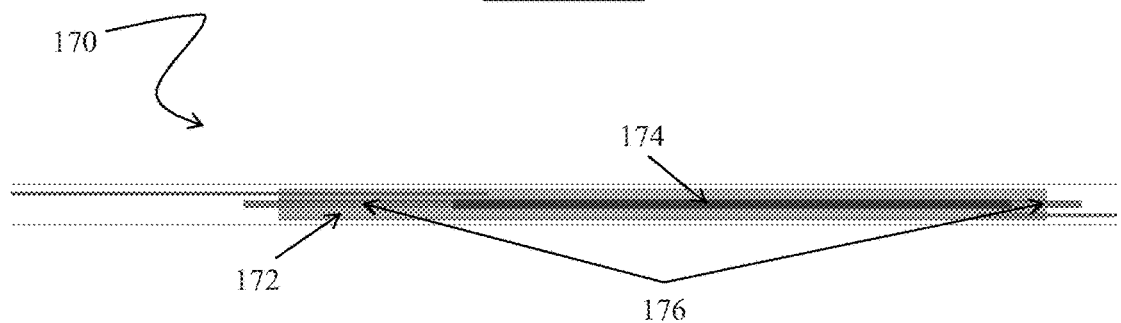

Let us now consider a task 170 displayed as on FIG. 17 and defined, at least, by
- the range of a start bound;
- the range of an end bound;
- the task schedule172, defined by the scheduled start value and the task scheduled end value;
- the minimal task duration 174;
- the maximal task duration 176.

The minimal task duration ($d^{low}$) is a lower bound of the scheduled task duration. In FIG. 17 it is represented by the length of the (e.g. dark blue) bar 174. The system may ensure that the provided value by the user satisfies:

$D_{min} \leq d^{low} \leq d$

The maximal task duration ($d^{up}$) is an upper bound of the scheduled task duration. In FIG. 17 it is represented by the length of the (e.g. light blue) bar 176 (wider than the maximal possible duration). The system may ensure that the provided value by the user satisfies:

$d \leq d^{up} \leq D_{max}$;

Both, the minimal task duration and the maximal task duration can be considered as a task's duration range [$d^{low}$, $d^{up}$].

If we consider our previous numerical example, this means that:

$7 \leq d^{low} \leq 11$
$11 \leq d^{up} \leq 18$

One can thus, in this case, for instance choose $d^{low}=8$ and $d^{up}=12$.

Figure 18:

FIG. 18 shows the four extreme durations superposed.

The system of the example thus provides a specific presentation of these durations to the user and they are managed in a specific way by the system. Indeed, the user can always see the allowed limits when he/she chooses the task minimal duration and/or the maximal one. Also, in a graphical interface the user is guided by the minimal possible duration bar and the maximal possible duration bar during the changing of the minimal duration.

Figure 19:
Figure 20:
Figure 21:
Figure 22:

FIG. 19 shows user-selectable bar chart extremities 190 for possibly changing diapasons of the minimal duration. FIG. 20 shows user-selectable bar chart extremities 200 for possibly changing diapasons of the maximal duration. The method of the example comprises a step of updating the minimal possible duration, which is restricted by the start upper bound and the end lower bound as we can see on FIG. 21. The method of the example comprises a step of updating the maximal possible duration, which is restricted by the start lower bound and the end upper bound as we can see on FIG. 22.

The assistance provided by the example system can then be completed by a solver or inference engine that can reduce the ranges provided by the user in a consistent way. Indeed, if we consider the previous simple numerical example again, it is possible to deduce that the start range can be modified to [5, 10]. Moreover, if the user related this task to other tasks using some temporal relations (e.g. "after" relation, or "before" relation), many algorithms such as Floyd-Warshall or PC-3 can be used to reduce these intervals for each task. But, the start/end and duration ranges can still be visualized. Users could then identify the elements that can be modified and the system can suggest "best case" and "worst case" schedules. This automatic suggestion could be performed along with the teaching of paper Rina Dechter, Itay Meiri, and Judea Pearl. *Temporal Constraint Networks. Artificial Intelligence* 49(1-3): 61-95 (1991) and/or paper Léon Planken, Mathijs de Weerdt, and Roman van der Krogt. *P3C: A New Algorithm for the Simple Temporal Problem. ICAPS*, page 256-263. AAAI, (2008).

It is noted that the system of the example further allows the user to choose independently for each task its displaying mode and go from one to the other one:
- a mode with a full displaying of the scheduled task together with all ranges, or
- a mode with a displaying the scheduled task only (in a way similar to Gantt diagrams).

Views can of course been mixed when displaying a schedule comprising several tasks, as shown on FIGS. 5A-5B.

Figure 23:
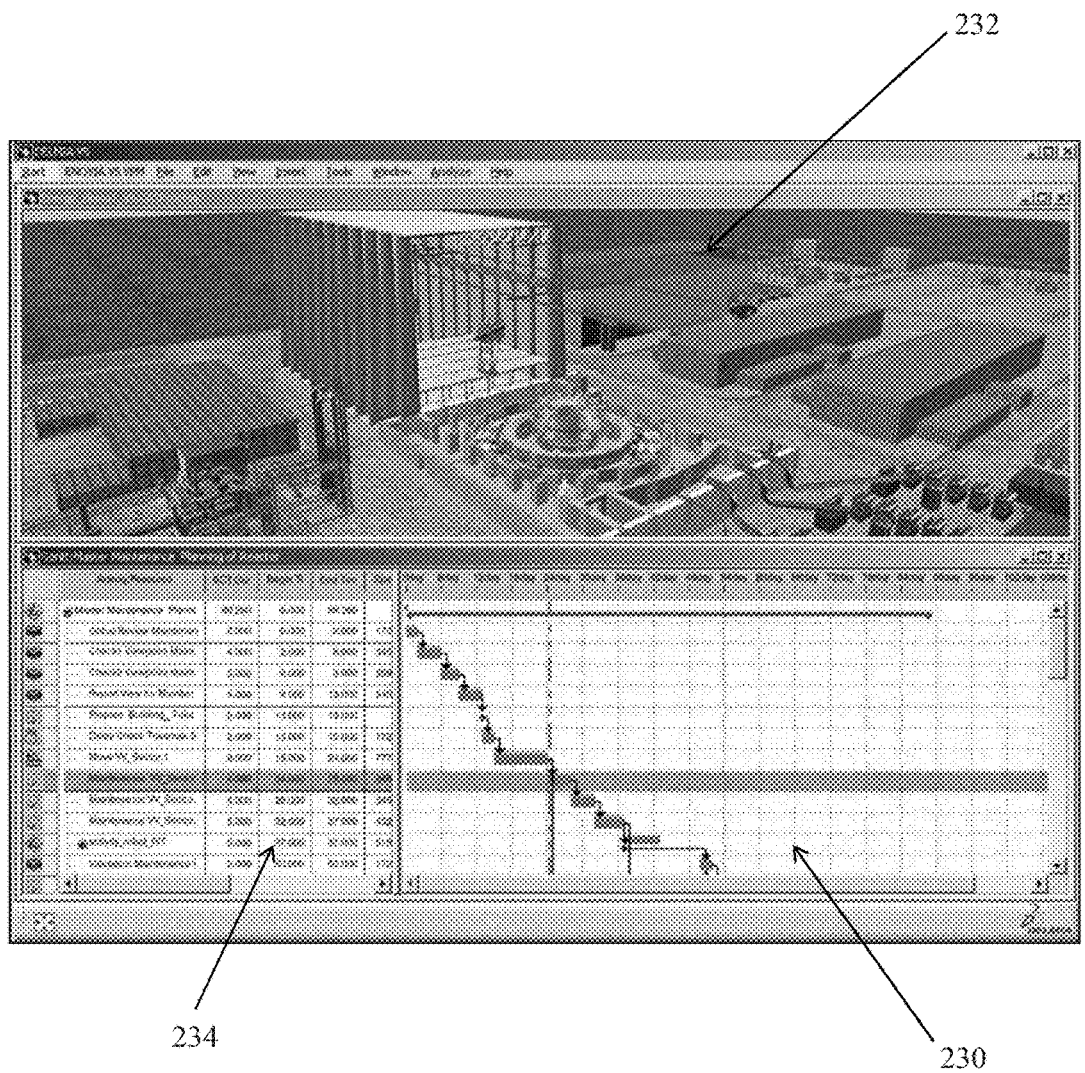

FIG. 23 illustrates an example of a GUI in a CAM (Computer-aided Manufacturing) solution of a prior art system, such as the one provided by the applicant under the trademark DELMIA, that could implement and benefit from the method, in particular a screenshot using such a GUI. The GUI of FIG. 23 may be partly or fully in accordance with the examples of FIGS. 5A-5B and 6, with the exception of the task visualization/direct edition block 230, which could be (instead of the prior art implementation of FIG. 23) in accordance with the examples of FIG. 5A and/or FIGS. 7-22. The system of FIG. 23 allows the management of an industrial project related to a facility (displayed in block 232), with the management/visualization of the schedule of manufacturing task(s), maintenance task(s), and/or mechanical part design task(s), displayed (step S20) within block 230. Block 234 comprises a list of tasks and may additionally provide full definition of the tasks, block 230 may allow for their scheduling/managing in accordance with the method, and block 232 may allow visualization of one or more task(s).

The invention claimed is:

1. A computer-implemented method for managing a task having a duration datum, a start datum, and an end datum, the method comprising:
   providing specifications of the task on a graphical user interface coupled to a processor, the graphical user interface receiving a user interaction with a displayed bar chart, and the processor editing, in accordance with the user interaction, a specification of the task represented by the displayed bar chart, the specifications including a duration range indicative of possible values for the duration of the task, a start range indicative of possible values for the start datum, an end range indicative of possible values for the end datum, and a schedule of the task, the schedule of the task including a scheduled start value for the start datum that belongs to the start range and a scheduled end value for the end datum that belongs to the end range, the specifications of the task being editable through predetermined rules of user-interaction with the bar charts, and ensuring that the scheduled start value belongs to the start range and the scheduled end value belongs to the end range; and
   displaying, on the graphical user interface, a timeline; and
   displaying, on the timeline, bar charts representative of specifications of the task, including
       at least a bar chart representative of the schedule of the task, and
       one or more of
           a bar chart representative of the minimum of the duration range and displayed containing the bar chart representative of the schedule of the task, the user interface receiving a user interaction while displaying bar chart representative of the minimum of the duration range, the user interaction comprising continuously and graphically interacting with the bar chart representative of the minimum of the duration range and the processor automatically editing the minimum of the duration range accordingly, a bar chart representative of the maximum of the duration range and displayed containing the bar chart representative of the schedule of the task, the user interface receiving a user interaction while displaying bar chart representative of the maximum of the duration range, the user interaction comprising continuously and graphically interacting with the bar chart representative of the maximum of the duration range and the processor automatically editing the maximum of the duration range accordingly, and a bar chart representative of the end range, the user interface receiving a user interaction while displaying bar chart representative of the end range, the user interaction comprising continuously and graphically interacting with the bar chart representative of the end range and the processor automatically editing the end range accordingly.

2. The method of claim 1, wherein at least one user-interaction with a respective bar chart includes continuously moving an extremity of the respective bar chart on the timeline, and accordingly editing the specifications of the task represented by the respective bar chart.

3. The method of claim 2, further comprising, during the move of the extremity of the respective bar chart on the timeline, upon the extremity of the respective bar chart encountering an extremity of another bar chart, reflecting the move of the extremity of the respective bar chart to the extremity of the other bar chart and accordingly editing the specifications of the task represented by the other bar chart.

4. The method of claim 3, wherein the encountered extremity of the other bar chart has an attribute whose value is indicative of an authorization to move, the reflection of the move to the extremity of the other bar chart being controlled by the value of said attribute.

5. The method of claim 4, wherein when the value of the attribute is indicative of freedom to move, the extremity of the other bar chart is moved together with the extremity of the respective bar chart, whereas when the value of the attribute is indicative of interdiction to move, the move of the extremity of the respective bar chart is blocked.

6. The method of claim 1, wherein the predetermined rules of user-interaction comprise sliding a bar chart on the timeline, and/or modifying the length of a bar chart.

7. The method of claim 6, wherein the sliding of the bar chart is performed by picking an interior of the bar chart and moving the bar chart, and the modifying of the length of the bar chart is performed by picking and moving an extremity of the bar chart.

8. The method of claim 1, wherein the displayed bar charts further include a bar chart representative of the start range and displayed containing a left extremity of the bar chart representative of the schedule of the task, and/or a bar chart representative of the end range and displayed containing a right extremity of the bar chart representative of the schedule of the task.

9. The method of claim 1, wherein the task is a manufacturing task, a maintenance task or a mechanical part design task.

10. A non-transitory data storage medium having recorded thereon a computer program comprising instructions, that when executed by a processor, cause the processor to perform a computer-implemented method for managing a task having duration datum, a start datum, and an end datum, the method comprising:

providing specifications of the task on a graphical user interface coupled to a processor, the graphical user interface receiving a user interaction with a displayed bar chart, and the processor editing, in accordance with the user interaction, a specification of the task represented by the displayed bar chart, the specifications including a duration range indicative of possible values for the duration of the task, a start range indicative of possible values for the start datum, an end range indicative of possible values for the end datum, and a schedule of the task, the schedule of the task including a scheduled start value for the start datum that belongs to the start range and a scheduled end value for the end datum that belongs to the end range, the specifications of the task being editable through predetermined rules of user-interaction with the bar charts, and ensuring that the scheduled start value belongs to the start range and the scheduled end value belongs to the end range; and displaying, on the graphical user interface, a timeline; and displaying, on the timeline, bar charts representative of specifications of the task, including at least a bar chart representative of the schedule of the task, and one or more of a bar chart representative of the minimum of the duration range and displayed containing the bar chart representative of the schedule of the task, the user interface receiving a user interaction while displaying bar chart representative of the minimum of the duration range, the user interaction comprising continuously and graphically interacting with the bar chart representative of the minimum of the duration range and the processor automatically editing the minimum of the duration range accordingly, a bar chart representative of the maximum of the duration range and displayed containing the bar chart representative of the schedule of the task, the user interface receiving a user interaction while displaying bar chart representative of the maximum of the duration range, the user interaction comprising continuously and graphically interacting with the bar chart representative of the maximum of the duration range and the processor automatically editing the maximum of the duration range accordingly, and a bar chart representative of the end range, the user interface receiving a user interaction while displaying bar chart representative of the end range, the user interaction comprising continuously and graphically interacting with the bar chart representative of the end range and the processor automatically editing the end range accordingly.

11. A computer system comprising:

a processor coupled to a memory and a graphical user interface, the processor being configured to provide specifications of a task on the graphical user interface that is coupled to the processor, the graphical user interface receiving a user interaction with a displayed bar chart, and the processor editing, in accordance with the user interaction, a specification of the task represented by the displayed bar chart, the specifications including a duration range indicative of possible values for the duration of the task, a start range indicative of possible values for a start datum, an end range indicative of possible values for an end datum, and a schedule of the task, the schedule of the task including a scheduled start value for the start datum that belongs to the start range and a scheduled end value for the end datum that belongs to the end range, the specifications of the task being editable through predetermined rules of user-interaction with the bar charts, the processor being configured to ensure that the scheduled start value belongs to the start range and the scheduled end value belongs to the end range, display, on the graphical user interface, a timeline, and display, on the timeline, bar charts representative of specifications of the task, including at least a bar chart representative of the schedule of the task, and one or more of a bar chart representative of the minimum of the duration range and displayed containing the bar chart representative of the schedule of the task, the user interface receiving a user interaction while displaying bar chart representative of the minimum of the duration range, the user interaction comprising continuously and graphically interacting with the bar chart representative of the minimum of the duration range and the processor automatically editing the minimum of the duration range accordingly, a bar chart representative of the maximum of the duration range and displayed containing the bar chart representative of the schedule of the task, the user interface receiving a user interaction while displaying bar chart representative of the maximum of the duration range, the user interaction comprising continuously and graphically interacting with the bar chart representative of the maximum of the duration range and the processor automatically editing the maximum of the duration range accordingly, and a bar chart representative of the end range, the user interface receiving a user interaction while displaying bar chart representative of the end range, the user interaction comprising continuously and graphically interacting with the bar chart representative of the end range and the processor automatically editing the end range accordingly.

12. The method of claim 2, further comprising, upon edits performed by the user, updating the minimum of the duration and/or the maximum of the duration, the minimum of the duration and the maximum of the duration being restricted by the start range and the end range.

13. The method of claim 3, wherein, after reflecting the move of the extremity of the respective bar chart to the extremity of the other bar chart and accordingly editing the specifications of the task represented by the other bar chart, ensuring that the scheduled start value belongs to the start range and the scheduled end value belongs to the end range.

* * * * *